United States Patent Office 3,483,190
Patented Dec. 9, 1969

3,483,190
PHTHALOCYANINE DYESTUFFS
Christian Zickendraht, Binningen, and Arthur Buehler, Rheinfelden, Aargau, Switzerland, assignors to Ciba Limited, Basel, Switzerland, a company of Switzerland
No Drawing. Continuation-in-part of application Ser. No. 416,899, Dec. 8, 1964. This application Sept. 26, 1967, Ser. No. 670,761
Claims priority, application Switzerland, Dec. 24, 1963, 15,943/63
Int. Cl. C09b 47/04
U.S. Cl. 260—239.6                                           7 Claims

ABSTRACT OF THE DISCLOSURE

The invention concerns new phthalocyanine dyestuffs containing at least one sulfonic acid amide group in which the amide nitrogen atom carries the residue of a nitrodiphenylamine free from sulfonic acid groups but that contains sulfonic acid amide groups.

CROSS-REFERENCES TO RELATED APPLICATIONS

This is a continuation-in-part of application Ser. No. 416,899, filed Dec. 8, 1964, now forfeited.

The present invention provides new phthalocyanine dyestuffs containing at least one sulfonic acid amide group in which the amide nitrogen atom carries the residue of a nitrodiphenylamine free from sulfonic acid groups but that contains sulfonic acid amide groups.

It concerns more especially phthalocyanine dyestuffs that contain as sole substituents sulfonamide groups of which the amide nitrogen atom in one or two of them bears an alkyl substituent having up to 12 carbon atoms and in one or two an o-nitrophenylaminophenyl group which bears a sulfonamide substituent, especially an alkyl- or alkoxyalkylamide substituent having up to 12 carbon atoms.

These phthalocyanine dyestuffs may be represented by the formula

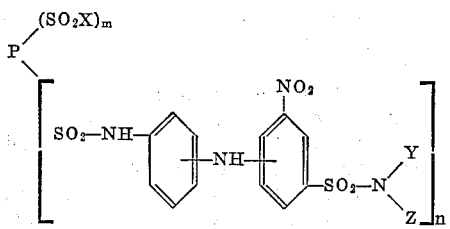

wherein P is selected from the group consisting of phthalocyanine, Cu-phthalocyanine, Co-phthalocyanine, and Ni-phthalocyanine; X is selected from the group consisting of hydroxy, alkoxy-alkylamino containing up to 15 carbon atoms, alkylamino containing up to 18 carbon atoms, cyclohexyloxy-alkylamino containing up to 9 carbon atoms, alkoxy-alkoxy-alkylamino wherein each alkoxy group contains up to 6 carbon atoms and said alkyl group up to 3 carbon atoms, morpholino, dialkylamino containing up to 8 carbon atoms, cyclohexylamino and N-methyl cyclohexylamino; Y is selected from the group consisting of hydrogen, alkyl containing up to 12 carbon atoms, hydroxyethyl, phenyl, and naphthyl; Z is selected from the group consisting of hydrogen, alkyl containing up to 3 carbon atoms, cyclohexyloxypropyl, alkoxy-alkyl containing up to 15 carbon atoms, alkoxy-alkoxy-alkyl containing up to 8 carbon atoms; Y being hydrogen when Z is an oxy-containing group, and Y and Z not both being hydrogen at the same time; or Y and Z when taken together with the N to which they are attached are morpholino or piperidino; $n$ and $m$ being an integer of from 1 to 3 and the sum of $n$ and $m$ being no greater than 4; and the attachment to said P of the —SO$_2$— groups is selected from the positions 3 and 4 of the benzo moieties of said P and combinations thereof.

The said dyestuffs may be obtained by amidating phthalocyanine sulfonic acid halides with aminonitrodiphenylamines free from sulfonic acid groups but containing sulfonic acid amide groups, if desired, together with ammonia or other amines, or when phthalocyanine sulfonic acid-N-aminophenylamides are condensed with halogen-containing nitrobenzene sulfonic acid amides to form phthalocyanine sulfonic acid-N-(nitro-phenylaminophenyl)-amides.

The phthalocyanine sulfonic acid halides mainly used in the process of the invention are the sulfochlorides of copper phthalocyanine, but it is also possible to use the sulfochlorides of cobalt or nickel phthalocyanine or of non-metallic phthalocyanine. The sulfochloride groups may be in 4- and/or 3-position, depending on whether 4-sulfophthalic acid is used in their preparation, or whether the groups are introduced by subsequent sulfonation or by direct sulfochlorination of the phthalocyanine. The number of groups can vary between 2 and 4. The phthalocyanines may also contain further substituents, for example, halogens.

In the process of the invention it is advantageous to use phthalocyanine tetrasulfochlorides in as pure a state as possible. Pure phthalocyanine tetrasulfochlorides, which produce specially valuable results, may be prepared, for example, by reacting phthalocyanine sulfonic acids or unsulfonated phthalocyanines with chlorosulfonic acid at a raised temperature (that is to say, at a temperature above 100° C., for example, between 120 and 140° C.) and treating the reaction medium with thionyl chloride prior to isolating the phthalocyanine tetrasulfochlorides.

The treatment of a reaction medium obtained in known manner with thionyl chloride is advantageously carried out at a temperature not exceeding 85° C. The tetrasulfochlorides that are formed can then be isolated from the reaction medium in known manner, for example, by discharging the reaction mixture into ice water.

By this process very pure phthalocyanine sulfonic acid chlorides are obtained that are specially suitable for reaction in accordance with the invention with amino-nitrodiphenylamines containing sulfonic acid amide groups.

This reaction between the phthalocyanine sulfonic acid halides and the nitrated aminodiphenylamines is advantageously carried out in an aqueous organic medium in the presence of agents capable of binding acid, for example, alkali hydroxides or alkaline earth hydroxides, alkali carbonates, sodium acetate, or tertiary bases, for example, triethanolamine or pyridine. If necessary, ammonia may also be used as agent capable of binding acid. Another amine may also be used together with the selected nitrodiphenylamine for reaction with further sulfohalide groups in the phthalocyanine used. The reaction temperature can be within a very wide range, but it is advantageous to use low temperatures, for example, between 20 and 70° C.

The aminonitrodiphenylamines used as starting materials in the process of the invention are advantageously orthonitrodiphenylamines, especially those of the formula

in which R$_1$ represents an ortho-nitrobenzene radical that must contain a sulfonamide group, especially a sulfonic acid-N-(alkoxyalkyl)-amide group but may also contain further substituents, and R$_2$ represents a phenylene radical.

As further substituents that may be present in the radical R$_1$ there may be mentioned, for example, alkyl or alkoxy groups, halogen atoms but preferably as sole substituent a sulfonic acid amide group.

The acylatable amino group bound to the radical $R_2$ is advantageously in meta-position or para-position to the nitrogen bridge.

The following are examples of nitrodiarylamino compounds of the defined:

4'-amino-2-nitrodiphenylamine-4-sulfonic acid amide,
3'-amino-2'-methyl-2:4-dinitrodiphenylamine-4'-sulfonic acid amide, and above all amino-nitrodiphenylamines free from sulfonic groups and carboxy groups and that contain a substituted sulfonamide group, for example, the condensation products obtained from meta- or para-phenylenediamine and 1-chloro-2-nitrobenzene-4-sulfonic acid-N-ethylamide,
1-chloro-2-nitrobenzene-4-sulfonic acid-N-hexylamide,
1-chloro-2-nitrobenzene-4-sulfonic acid-N-dodecylamide,
1-chloro-2-nitrobenzene-4-sulfonic acid-N-phenylamide,
1-chloro-2-nitrobenzene-4-sulfonic acid-N-naphthylamide,
1-chloro-2-nitrobenzene-4-sulfonic acid-N:N-diethylamide,
1-chloro-2-nitrobenzene-4-sulfonic acid-N-methyl-N-phenylamide,
1-chloro-2-nitrobenzene-4-sulfonic acid-morpholide,
1-chloro-2-nitrobenzene-4-sulfonic acid-piperidide,
1-chloro-2-nitrobenzene-4-sulfonic acid-N:β - ethoxyethylamide,
1-chloro-2-nitrobenzene-4-sulfonic acid-N:γ-methoxypropylamide,
1-chloro-2-nitrobenzene-4-sulfonic acid-N:γ-ethoxypropylamide,
1-chloro-2-nitrobenzene-2-sulfonic acid-N:γ-ethoxypropylamide,
1-chloro-2-nitrobenzene-4-sulfonic acid-N:γ-isopropoxypropylamide,
1-chloro-2-nitrobenzene-4-sulfonic acid-N:γ-(ethoxyethoxy)-propyl-amide,
1-chloro-2-nitrobenzene-4-sulfonic acid-N:γ-dodecyloxypropyl-amide,
1-chloro-2-nitrobenzene-4-sulfonic acid-N:γ-(2'-ethylhexoxy)-propylamide,
1-chloro-2-nitrobenzene-4-sulfonic acid-N:γ-cyclohexyloxypropylamide As further amines that may be reacted with the phthalocyanine-polysulfonic acid halide (simultaneously, that is to say, together with the aminoitrodiphenylamine, or subsequently) there may be mentioned: methylamine, ethylamine, butylamine, cyclohexylamine, dodecylamine, stearylamine, diethylamine, N-methylcyclohexylamine, dibutylamine, morpholine or similar amines, and also alkoxyalkylamines, especially alkoxyethylamines or alkoxypropylamines, for example, β-methoxyethylamine, γ-methoxypropylamine, β-ethoxyethylamine, γ-ethoxypropylamine, γ-(2 - ethylhexoxy) - propylamine, γ - isopropoxypropylamine, γ - dodecyloxypropylamine, ethoxy - ethoxypropylamine and the like.

The condensation processes in accordance with the invention are advantageously carried out in a manner such that the amino-ortho-nitrodiphenylamine and the additional amines are reacted together with or successively with the phthalocynanine polysulfochloride.

All the condensation reactions are advantageously performed in an aqueous organic medium at pH values between 6 and 8. It may be of advantage to increase the pH value somewhat step by step, depending on the starting materials used. It is generally of advantage to keep the pH value as constant as possible during a single step, which is quite easily achieved by keeping a continuous check on the pH and by neutralization of the hydrohalic acid that is liberated, for example, by means of alkali carbonates or alkali hydroxides.

The dyestuffs obtainable by the process of the present invention are new. They can also be prepared by a modification of the process which comprises condensing aminophenylamides of the phthalocyanine sulfonic acids with halogenated nitrobenzenesulfonamides, especially ortho-halogen - nitrobenzenesulfonamides, to form nitrated phthalocyanine sulfonic acid-N-(sulfonamidophenylaminophenyl)-amides.

Aminophenylamides of phthalocyaninesulfonic acids that can be used in this process are mono-, di-, tri- or tetra-amides, for example, mono-, di- and tri-(meta- or para-aminophenyl)-amides of copper phthalocyanine tetrasulfonic acid. They can be condensed in the presence of alkali, for example, with ortho-nitro-chlorobenzene sulfonic acid amides, for example with 1-chloro-2-nitrobenzene-4-sulfonic acid-N-ethylamide,
1-chloro-2-nitrobenzene-4-sulfonic acid-N - hydroxyethylamide,
1-chloro-2-nitrobenzene-4-sulfonic acid-N-hexylamide,
1-chloro-2-nitrobenzene-4-sulfonic acid-N-dodecylamide,
1-chloro-2-nitrobenzene-4-sulfonic acid-N-phenylamide,
1-chloro-2-nitrobenzene-4-sulfonic acid-N-naphthylamide,
1-chloro-2-nitrobenzene-4-sulfonic acid-N:N-diethylamide,
1-chloro-2-nitrobenzene-4-sulfonic acid-N-methyl-N-phenylamide,
1-chloro-2-nitrobenzene-4-sulfonic acid-morpholide,
1-chloro-2-nitrobenzene-4-sulfonic acid-piperidide,
1-chloro-2-nitrobenzene-4-sulfonic acid-N:β - ethoxyethylamide,
1-chloro-2-nitrobenzene-4-sulfonic acid-N:γ-methoxypropylamide,
1-chloro-2-nitrobenzene-4-sulfonic acid-N:γ-ethoxypropylamide,
1-chloro-2-nitrobenzene-4-sulfonic acid-N:γ-isopropoxypropyl amide,
1-chloro-2-nitrobenzene-4-sulfonic acid-N:γ-dodecyloxypropylamide and
1-chloro-2-nitrobenzene-4-sulfonic acid-N:γ-cyclohexyl oxypropylamide.

The condensation is advantageously carried out in an aqueous medium or organic aqueous medium in the presence of an alkali, for example, in the presence of sodium bicarbonate, potassium bicarbonate, sodium carbonate, potassium carbonate and the like, by heating the reaction mixture, preferably to boiling temperature. It may be carried out in an open vessel or in a closed vessel under superatmospheric pressure.

The dyestuffs obtainable by the process of the invention are suitable for dyeing a very wide variety of materials. Those dyestuffs that are insoluble in organic solvents or water may be used as pigments and those soluble in organic solvents, for example, esters and especially in alcohol and acetone, may be used for coloring natural and synthetic resins, waxes, lacquers and plastic compositions, for example, those prepared from cellulose ethers or cellulose esters. They can also be used for example, for the spin-coloration of cellulose acetate rayon and for coloring natural and synthetic polymers and condensation products.

The dystuffs of the invention may be used in the spin-coloration of cellulose acetate rayon, for example, to produce clear tints that are fast to cross-dyeing, light, chlorine and flue gases.

When the dyestuffs of the invention contain acidic groups imparting solubility in water, for example, a sulfonic acid group formed by hydrolysis of one of the sulfochloride radicals, they can be reacted with colored or colorless amines (for example, with basic dyestuffs of the xanthene series or with guanidine, diphenyl guanidine, di-cyclohexylamine and the like) to form the corresponding salts that can be used as dyestuffs for lacquers.

The following examples illustrate the invention. Un-

EXAMPLE I 117 parts of copper phthalocyanine-3:3′:3″-trisulfonic acid-N-(para-aminophenyl)-amide-3‴-sulfonic acid were suspended in 2,000 parts of water, 101 parts of 2-nitro-1-chlorobenzene-4-sulfonic acid-N:γ-isopropoxypropylamide and 26 parts of sodium bicarbonate were added and the whole stirred under reflux for 16 hours. After this period no free amino groups were detectable. The dark green condensation product was isolated from the reaction mixture by filtration and washed with water. When dry it was a green powder that dissolved readily in acetone to give a green solution and could be used for coloring cellulose acetate spinning compositions.

By using 92 parts of 2-nitro-1-chlorobenzene-4-sulfonic acid-N:γ-methoxypropylamide in the above example instead of 2-nitro-1-chlorobenzene-4-sulfonic acid-N:γ-isopropoxypropylamide, a green condensation product was obtained insoluble in acetone but very readily soluble in benzyl alcohol. It could be used in the preparation of inks for ball-point pens.

EXAMPLE 2

97 parts of copper phthalocyanine-tetrasulfochloride in the form of a 40% aqueous paste were stirred into 1,500 parts of ethyl alcohol, 42 parts of crystallized sodium acetate and 164 parts of 4-amino-2′-nitrodiphenylamine-4′-sulfonic acid-N:γ-isopropoxypropylamide (obtained by the monocondensation of 2-nitro-1-chlorobenzene-4-sulfonic acid-N:γ-isopropoxypropylamide with para-phenylene diamine) were added and the whole stirred for a long time at 40 to 45° C. After the condensation, the ethyl alcohol was distilled off and the dyestuff isolated by filtration. When dry, the condensation product was a green powder very readily soluble in acetone. It could be used to color cellulose acetate spinning compositions yellowish green tints.

EXAMPLE 3

97 parts of copper phthalocyanine-tetrasulfochloride were stirred into 1,200 parts of ethyl alcohol, 42 parts of crystallized sodium acetate and 82 parts of 4-amino-2′-nitrodiphenylamine-4′-sulfonic acid-N:γ-isopropoxypropylamide were added and the whole stirred for 3 hours at 40 to 45°. 24 parts of isopropoxypropylamine were added and stirring continued at 40 to 45° C. for a long time. After the condensation the dyestuff was isolated by filtration, washed with ethyl alcohol and dried. It was a green powder very readily soluble in acetone and could be used for coloring cellulose acetate spinning compositions bluish green tints.

Dyestuffs were prepared by the same process from the components listed in the following table, copper phthalocyanine-tetrasufochloride being used as starting material in each case. The nitrodiphenylamine derivatives used are listed in column I and the bases in column II. Column III indicates the tint obtainable with the dyestuffs produced. Two sulfochloride groups reacted with the nitrodiphenylamine derivative in all cases.

| I | II | III |
|---|---|---|
| $H_2N-\langle\rangle-NH-\langle\rangle(NO_2)-SO_2NH-(CH_2)_3-OCH-(CH_3)_2$ | $H_2N-(CH_2)_3-OCH-(CH_3)_2$ | Bluish green. |
| Same as above. | $H_2N-(CH_2)_{11}-CH_3$ | Do. |
| Same as above. | $H_2N-(CH_2)_3-O-CH\langle\begin{smallmatrix}CH_2-CH_2\\CH_2-CH_2\end{smallmatrix}\rangle CH_2$ | Do. |
| Same as above. | $H_2N-(CH_2)_3-O-(CH_2)_{11}-CH_3$ | Do. |
| Same as above. | $H_2N-(CH_2)_3-O-(CH_2)_2 O \cdot C_2H_5$ | Do. |
| $H_2N-\langle\rangle-NH-\langle\rangle(HNO_2S,(CH_2)_3,OCH-(CH_3)_2)-NO_2$ | $H_2N-(CH_2)_{11}-CH_3$ | Green. |
| $\langle\rangle(H_2N,O_2N)-NH-\langle\rangle-SO_2NH-(CH_2)_3-OCH-(CH_3)_2$ | $H_2N-(CH_2)_{11}-CH_3$ | Do. |
| $H_2N-\langle\rangle-NH-\langle\rangle(O_2N)-SO_2NH-(CH_2)_3-OCH-(CH_3)_2$ | $H_2N-(CH_2)_3-O-(CH_2)_2-CH(C_2H_5)-CH_2CH-(CH_3)_2$ | Do. |
| $H_2N-\langle\rangle-NH-\langle\rangle(O_2N)-SO_2NH-(CH_2)_3-O-CH_2CH_2-O-CH(CH_3)_2$ | $H_2N-(CH_2)_{11}-CH_3$ | Do. |
| Same as above. | $H_2N-(CH_2)_3-O-(CH_2)_2-O-CH_2-CH(C_2H_5)_2$ | Do. |
| $H_2N-\langle\rangle-NH-\langle\rangle(O_2N)-SO_2NH-(CH_2)_3-OCH-(CH_3)_2$ | $H_2N-(CH_2)_3-O-CH(CH_3)-CH_2-CH(CH_3)_2$ | Do. |

Example 4

92 parts of nickel phthalocyanine - tetrasulfochloride were stirred into 1,200 parts of ethyl alcohol, 42 parts of crystallized sodium acetate and 82 parts of 3-amino-2'-nitrodiphenylamine-4'-sulfonic acid - N:γ-isopropoxypropylamide were added and the whole stirred for 3 hours at 40 to 45° C. 24 parts of isopropoxypropylamine were then added and stirring continued at 40 to 45° C. for a long time. After the condensation, the dyestuff was isolated by filtration and dried. It was a green powder very readily soluble in acetone and could be used for coloring cellulose acetate spinning compositions.

By using the corresponding 4-amino derivative in the above example instead of 3-amino-2'-nitrodiphenylamine-4'-sulfonic acid-N:γ - isopropoxypropylamide, a dyestuff having similar properties was obtained.

Example 5

97 parts of copper phthalocyanine tetrasulfochloride are stirred into 1200 parts of ethanol, 42 parts of crystalline sodium acetate and 38 parts of 4-amino-2'-nitrodiphenylamine-4'-sulfonic acid-N:γ-methoxy propylamide are added and the whole stirred for 2 hours at 40–45° C. 56 parts of dodecylamine are then added and stirring is continued for some length of time at 40–45° C. When condensation is complete, the ethanol is distilled off and the dyestuff filtered off. It is a blue-green power which is soluble in acetone and can be used for coloring cellulose acetate greenish blue tins.

We claim:
1. A phthalocyanine dyestuff of the formula

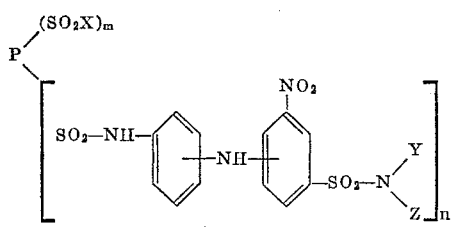

wherein P is selected from the group consisting of phthalocyanine, Cu-phthalocyanine, Co-phthalocyanine and Ni-phthalocyanine; X is selected from the group consisting of hydroxy, alkoxy-alkylamino containing up to 15 carbon atoms, alkylamino containing up to 18 carbon atoms, cyclohexyloxy-alkylamino containing up to 9 carbon atoms, alkoxy-alkoxy-alkylamino wherein each alkoxy group contains up to 6 carbon atoms and said alkyl group up to 3 carbon atoms, morpholino, dialkylamino containing up to 8 carbon atoms, cyclohexylamino and N-methyl cyclohexylamino; Y is selected from the group consisting of hydrogen, alkyl containing up to 12 carbon atoms, hydroxyethyl, phenyl, and naphthyl; Z is selected from the group consisting of hydrogen, alkyl containing up to 3 carbon atoms, cyclohexyloxypropyl, alkoxyalkyl containing up to 15 carbon atoms, alkoxy-alkoxy-alkyl containing up to 8 carbon atoms; Y being hydrogen when Z is an oxy-containing group, and Y and Z not both being hydrogen at the same time; or Y and Z when taken together with the N to which they are attached are morpholino or piperidino; n and m being an integer of from 1 to 3 and the sum of n and m being no greater than 4; and the attachment to said P of the —$SO_2$— groups is selected from the positions 3 and 4 of the benzo moieties of said P and combination thereof.

2. A phthalocyanine dyestuff as claimed in claim 1 wherein P is Cu-phthalocyanine.

3. A phthalocyanine dyestuff as claimed in claim 1, which corresponds to the formula

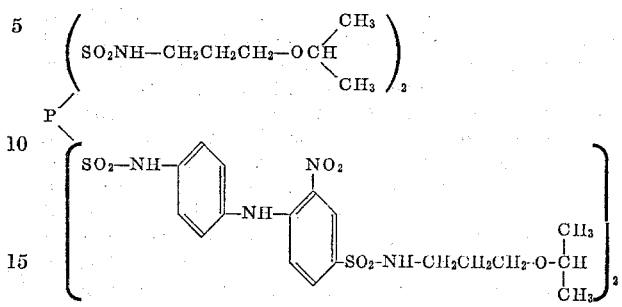

wherein P is the Cu-phthalocyanine radical.

4. A phthalocyanine dyestuff as claimed in claim 1, which corresponds to the formula

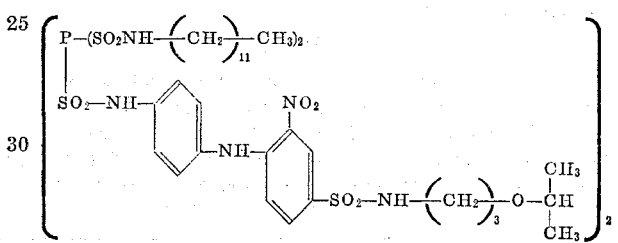

wherein P is the Cu-phthalocyanine radical.

5. A phthalocyanine dyestuff as claimed in claim 1 wherein P is selected from the group consisting of Cu-phthalocyanine, and Ni-phthalocyanine; X is selected from the group consisting of hydroxy, alkoxy-alkylamino containing up to 12 carbon atoms, alkylamino containing up to 18 carbon atoms, cyclohexyloxy-alkylamino containing up to 9 carbon atoms and alkoxy-alkoxy-alkylamino wherein each alkoxy group contains up to 6 carbon atoms and said alkyl group up to 3 carbon atoms; m and n are each 2; Y is hydrogen; Z is selected from the group consisting of propyl, alkoxypropyl wherein the alkoxy group contains up to 3 carbon atoms, alkoxy-alkoxy-propyl wherein each alkoxy group contains up to 3 carbon atoms; and the —NH— bridge is bonded to the nitrophenyl moiety in a position ortho or meta to the nitro group and the attachment to said P of the —$SO_2$— is selected from the positions 3 and 4 of the benzo moieties of said P and only one of said —$SO_2$— groups on any one benzo moiety.

6. A phthalocyanine dyestuff as claimed in claim 5, wherein P is Cu-phthalocyanine.

7. A phthalocyanine dyestuff as claimed in claim 6, wherein the attachment to said P of the —$SO_2$— groups is at the 3 positions of the benzo moieties of said P.

References Cited
UNITED STATES PATENTS 3,305,559  2/1967  Kühne et al. _____ 260—314.5
3,409,633  11/1968  Springer _____ 260—314.5
3,426,016  2/1969  Springer et al. _____ 260—239.6

HENRY R. JILES, Primary Examiner

C. M. SHURKO, Assistant Examiner

U.S. Cl. X.R.

8—4, 6, 57; 106—22, 288; 260—239.7, 239.8, 247.1, 293.4, 314.5